United States Patent [19]
Macé

[11] Patent Number: 5,803,387
[45] Date of Patent: Sep. 8, 1998

[54] METHOD AND APPARATUS FOR THE QUICK REWINDING OF A RECORDING TAPE

[75] Inventor: Pilippe Macé, Kappel, Germany

[73] Assignee: Deutsche Thomson-Brandt GmbH, Germany

[21] Appl. No.: 754,716

[22] Filed: Nov. 21, 1996

Related U.S. Application Data

[63] Continuation of Ser. No. 410,409, Mar. 3, 1995, abandoned, which is a continuation of Ser. No. 120,999, filed as PCT/EP92/00510, Mar. 7, 1992, abandoned.

[30] Foreign Application Priority Data

Mar. 14, 1991 [DE] Germany .......................... 41 08 340.7

[51] Int. Cl.$^6$ .......................... B65H 59/38; G11B 15/46
[52] U.S. Cl. ...................... 242/334.4; 242/333.6
[58] Field of Search .................... 242/333.1, 333.7, 242/333.6, 334.1, 334.3, 334.4, 334.5, 333.5, 334.2; 360/73.01, 73.06

[56] References Cited

U.S. PATENT DOCUMENTS

| | | | |
|---|---|---|---|
| 4,338,645 | 7/1982 | Mohriet et al. | 242/333.7 X |
| 4,478,376 | 10/1984 | Sakaguchi et al. | 242/191 |
| 4,516,740 | 5/1985 | Yoshino et al. | 242/334.5 |
| 4,561,608 | 12/1985 | O'Gwynn et al. | 242/333.5 |

FOREIGN PATENT DOCUMENTS 2 082 373  3/1982  United Kingdom ............ G11B 15/48

OTHER PUBLICATIONS

Patent Abstract Of Japan vol. 7 No. 150 (P–207) Jun. 10, 1981.
Patent Abstract Of Japan vol. 12 No. 361 (P–763) Oct. 28, 1986.
Patent Abstract Of Japan vol. 13 No. 175 (P–863) Jun. 30 1987 App.No. 62–164630.
Patent Abstract Of Japan vol. 13. No. 175 (P–863) Jun. 30 1987 App.No. 62–164629.

*Primary Examiner*—John Q. Nguyen
*Attorney, Agent, or Firm*—Joseph S. Tripoli; Joseph J. Laks; Francis A. Davenport

[57] ABSTRACT

A system for rapidly rewinding a tape from a first spool onto a second spool of a recording device. First and second sensors respectively sense the rotational speed of the first and second spools. The thickness of the tape, the radius of a core of the spool and the total thickness of tape present on the core are stored. A calculator receives the rotational speeds, the tape thickness, the radius and the total thickness, and calculates the remaining rewinding time and provides a deceleration signal while the remaining rewinding time is sufficient to decelerate the first spool to a final rotational speed.

7 Claims, 3 Drawing Sheets

METHOD AND APPARATUS FOR THE QUICK REWINDING OF A RECORDING TAPE

This is a continuation of PCT application PCT/EP 92/00510 filed Mar. 7, 1992 by Philippe Mace and titled "Quick Rewinding Process And Device For Recording Tapes" which is a continuation of application Ser. No. 08/120,999 filed Sep. 13, 1993 abandoned.

This is a continuation of application Ser. No. 08/410,409, filed on Mar. 3, 1995 abandoned.

BACKGROUND OF THE INVENTION

This invention relates to the field of tape recording and in particular to the rapid rewinding of a recording tape medium.

With the recording of information such as, for example, digital data for data processing apparatus or digital or analog data for audio or video reproducing apparatus, recording tapes may be used which store such information. This can be carried out using magnetic, optical or other methods known to the expert in the art.

When using the above-mentioned recording tapes these are usually wound forward and backwards respectively at differing speeds. Hereby, a distinction is often made between, on the one hand, the speeds at which the information is read from the recording tape. These are referred to as the so-called playback speed and the so-called search mode.

On the other hand, where appropriate, the playback tape is quickly wound forward or backwards. If, hereby, the winding continues until the respective end is reached, then this is referred to here as quick rewinding.

The following description refers to the quick rewinding of a video cassette. However, is should be pointed out that the invention is not limited to this application.

Usually, the magnetic tape in a video cassette exhibits a tape-end mark at both ends constructed as a transparent tape. When this mark is detected the recorder applies braking means to both a first or supply reel, and a second or take-up reel or spool.

As this braking process only happens at a predetermined maximum braking rate it is possible that the tape hits the stop at a speed higher than permissible, which may lead to tape rupture. However, if the braking process happens at a higher braking rate then tape loops may appear.

Known solutions limit the rewinding speed or, more precisely, the rotational speed of the first feeding spool to a maximum speed the value of which is dimensioned so high that the deceleration achieved by the braking process is sufficient to avoid the tape hitting the stop.

However, the limitation of the rewinding speed to this maximum speed leads to quite a long time being required for rewinding.

SUMMARY OF THE INVENTION

It is the object of the present invention to realize a rewinding of a recording tape in which, on the one hand, the time required therefor, the so-called rewinding time, is reduced and, on the other hand, it is prevented that the recording tape hits the stop at an impermissibly high speed.

A desired (target) value for an end rotational speed is determined which is to be exhibited by the first spool, i.e. the spool from which the recording tape is fed, prior to its being braked by a braking means which is controlled by a tape end marking. This determination can happen, for example, depending on the braking effect of the braking means as well as the distance of the tape end mark from the actual tape end.

Further, a target value for the deceleration of the first spool is determined in order that the rotational speed of the first spool is decelerated to the end rotational speed. This can happen, for example, in that the force driving the second spool, i.e. the spool onto which the recording tape is wound, is reduced. This can be carried out taking into account the total mass of the recording tape, the spools, as well as further circumstances.

Now, in order to keep the rewinding time as short as possible, the second spool is accelerated by a drive motor to a maximum rotational speed and, usually, owing to the characteristics of the drive motor, subsequently maintained at this rotational speed. The rotational speed of the first spool progressively increases caused, among other things, by the fact that the perimeter of the taken-up recording tape is constantly increasing while that of the feeding tape is constantly decreasing.

In order to prevent the recording tape from hitting the stop at impermissibly high speed the rotational speed (W1) of the first spool is increased to a maximum rotational speed (Wm) as long as the remaining rewinding time is sufficient to decelerate the rotational speed of the first spool to a predetermined end rotational speed (Wo) in accordance with a predetermined target value for the deceleration (al).

Advantages of the system according to the invention are that, owing to the timely initiation of the deceleration, the mechanical stress on the recording tape used is reduced and the comfort of operation is increased.

If the rewinding time is determined from the actual number of windings on the first spool this has, in particular, the advantage that the system according to the invention will function satisfactorily even when recording tapes with differing tape lengths are used or when rewinding is started at a time when a part of the tape has been rewound already.

The number of respective actual windings can be determined from the thickness of the recording tape, if applicable, from the thickness of a core around which the recording tape is wound, and from the thickness of the total recording tape on the first spool. This renders possible a simple system for determining the number of the respective actual windings.

When using existing sensors and taking into account the procedure steps recited, simple and inexpensive systems are realized.

DETAILED DESCRIPTION

Prior to going further into the description of the embodiment examples, it should be pointed out that the blocks shown separately in the figures merely serve for the better understanding of the invention. Usually, individual ones or several of these blocks are combined to units. These can be realized in integrated or hybrid technology or as a program controlled microcomputer or, respectively, in the form of a program suitable for its control.

It goes without saying that elements in the individual stages can also be realized in separate form.

In the following, means and signal progressions with identical meanings are referred to in the figures by the same identification characters respectively.

Figure 1:
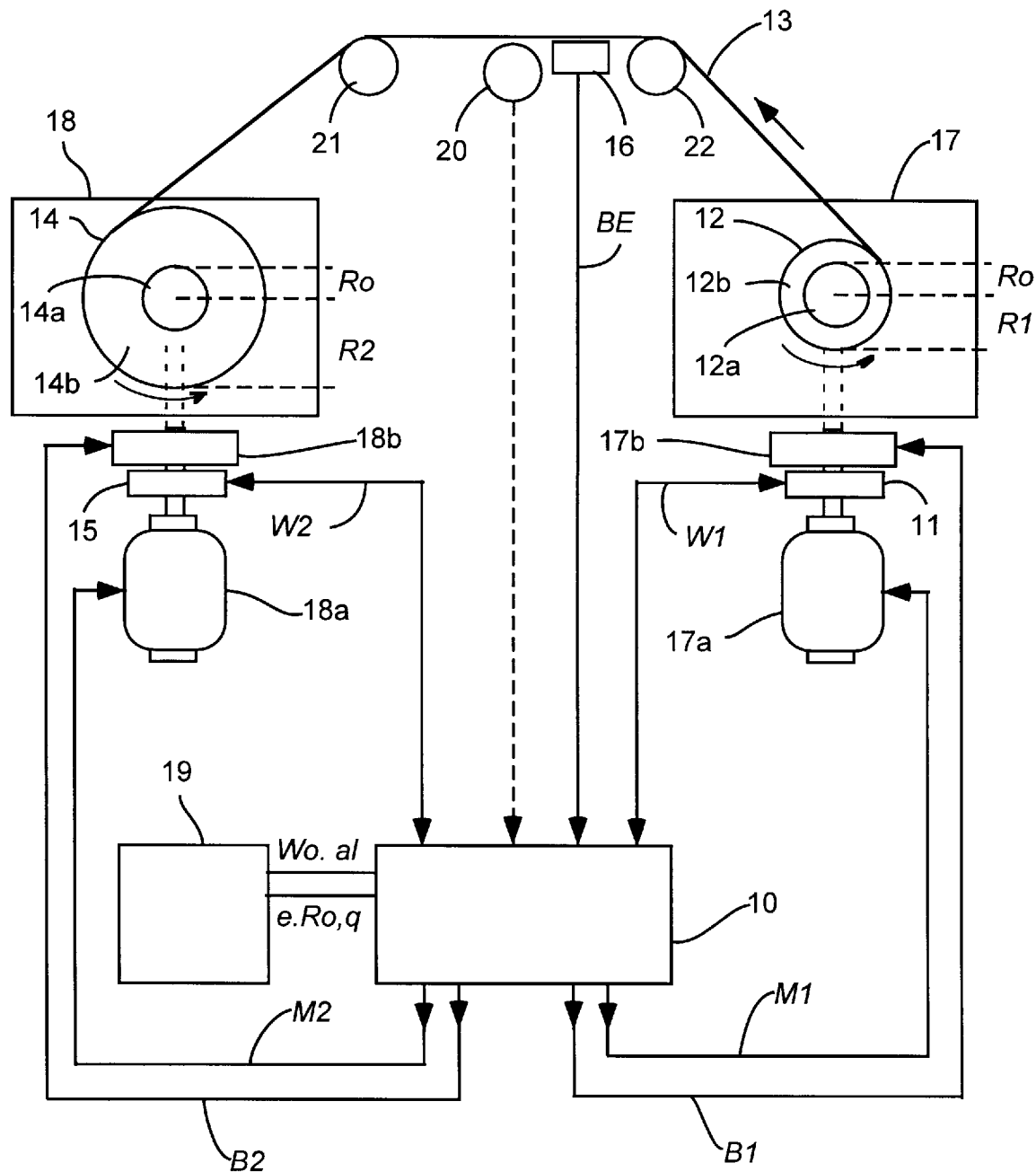
FIG. 1: shows an embodiment example of the device according to the invention.

FIG. 1 shows symbolically an embodiment example of the device according to the invention. What is shown here is a section in the form of elements of a video recorder or video player respectively in which a corresponding cassette is rewound. Only those means are represented which are essential for the understanding of the invention.

An electronic controller 10 receives signals from a first rotational speed sensor 11, said signals being a measure for the rotational speed W1 of a first spool 12 from which a recording tape 13 is wound on to a second spool 14.

The first spool 12 comprises a first core 12a with a radius R0 and a residual quantity (remainder) 12b containing N1 windings of the playing tape 13 which exhibits a thickness e thereby resulting in a total thickness D1 of the remainder 12d of $D1 = N1*e$.

The first total radius R1 is consequently computed in accordance with $R1 = R0 + D1$.

The second spool 14 is the same as the first spool, by a second core 14a which in this embodiment example exhibits the same radius R0 as the first core 12a and a take-up quantity 14b with N2 windings having the thickness D2:

$D2 = N2*e$.

Therefor the second total radius R2 results as follows:

$R2 = R0 + D2$.

The rotational speed W2 of the second spool 14 is detected by a second rotational speed sensor 15 which sends out corresponding signals to the electronic controller 10.

The rotational speed sensors 11 and 15 respectively are preferably designed such that digital marks disposed on a rotor, which is not shown here, are detected and the rotational speed is deduced therefrom. The rotational speed of one of these rotors is coupled with the rotational speed of the associated spool 12 or 14 respectively resulting in time intervals between the individual marks which are inversely proportional to the rotational speed of the spool under consideration.

The electronic controller 10 further receives signals BE from a tape end sensor 16 which detects a tape end mark of the recording tape 13. This can happen electrically, optically, magnetically or in a similar manner, and the tape end sensor 16 will be designed accordingly.

The first spool 12 is connected to a first rotating means 17 containing first drive means such as an electric motor 17a including associated triggering means as well as first braking means 17b. The electronic controller 10 transmits signals M1 triggering said first drive means and signals B1 triggering said first braking means to said first rotating means.

A second rotating means 18 is the same as the first rotating means 17 with a second drive means for example motor 18a and a second braking means 18b. These receive corresponding triggering signals M2 and B2 respectively from the electronic controller 10.

Instead of two drive means contained in the rotating means 17 and 18 respectively, a single drive means may be used to provide the driving effect of which is directed via suitable deviating means to the spool 12 or 14 which is to be driven.

The first drive means or, respectively, the aforesaid deviation of the drive effect to the first spool 12 is necessary for rewinding only if this is to happen also into the second direction, i.e. from the second spool 14 to the first spool 12. Such a rewinding procedure is performed in a similar manner to that which is described in detail here.

Furthermore, a memory 19 is provided in which a target value relating to a maximum braking rotational speed Wo, a value relating to a maximum deceleration rate al, values e for the thickness of the playing tape 13 and values for the radius R0 of the cores 12a and 14a respectively are stored and which sends corresponding signals to the electronic controller 10. Moreover, a surface value q, as defined below, is stored.

In addition, a read head 20 can be provided which detects additional marks impressed upon the recording tape 13. This enables corresponding signals such as, for example, a start-of-film (or program start) identification to be sent to the electronic controller 13 which thereupon causes the rewinding procedure to stop.

Two deflecting rollers 21 and 22 serve for a suitable guiding of the recording tape 13.

Figure 2:
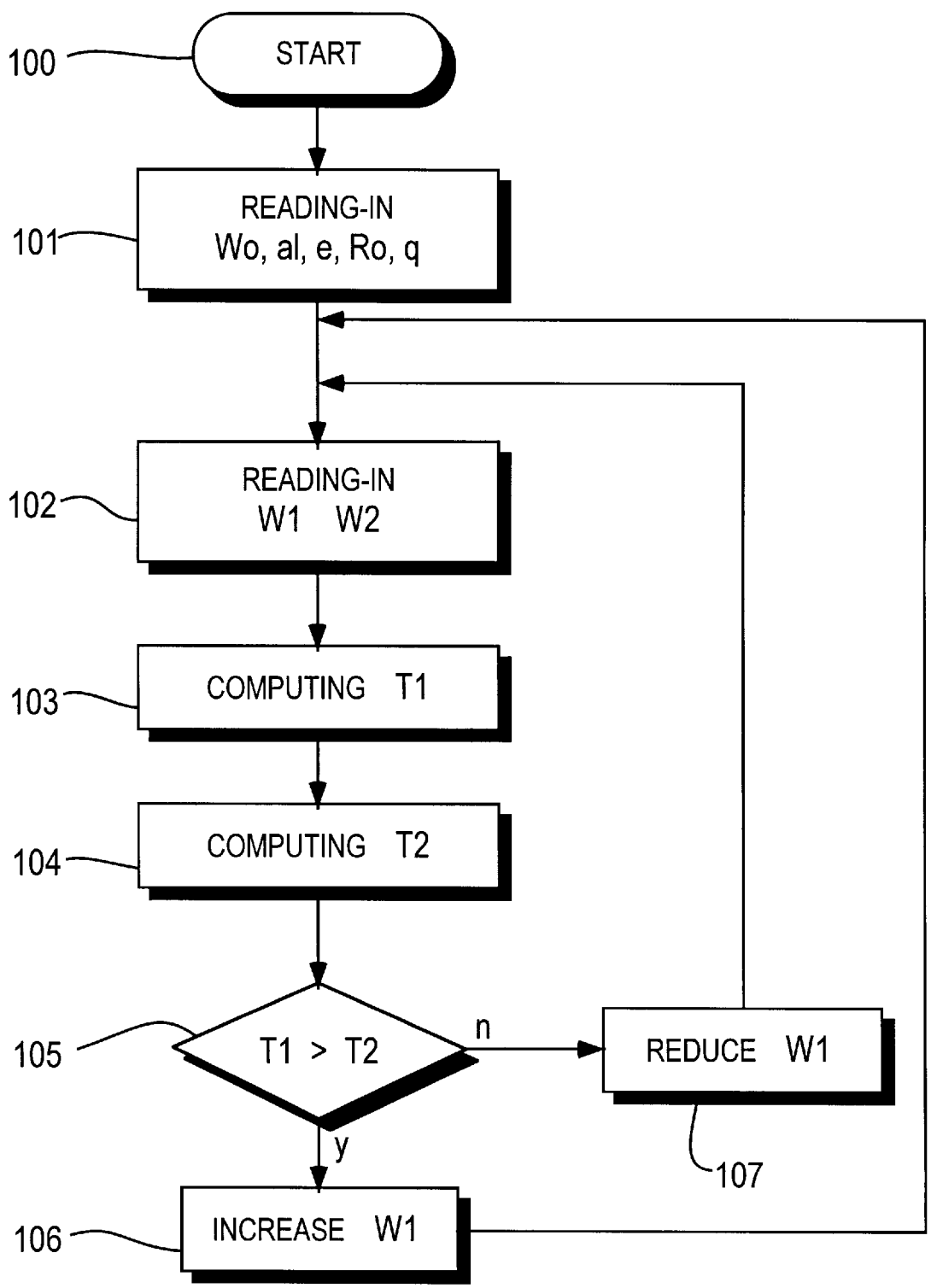
FIG. 2: shows a flow chart of a first embodiment example of the process according to the invention.

The process according to the invention will now be illustrated by means of the flow chart of FIG. 2 as well as the diagram of FIG. 3.

Following the start of a rewinding procedure in step 100 the electronic controller 10, in step 101, reads in the following values from the memory 19:

the target value for the braking rotational speed Wo which the first spool is supposed to exhibit prior to it being braked by the braking means, the maximum value for the deceleration al, a value for the tape thickness e, the surface value q which depends on the total surface A of the tape 13 to be rewound and wound up already as well as the surface of the cores 12a, 14a, i.e. $q^2 = k*(R1^2 + R2^2)$, the value R0.

In accordance with a first version of this embodiment example the above-mentioned values stored in memory 19 have been determined by the manufacturer and correspond to average values or, respectively, critical extreme values ensuing with the employment of usual video cassettes.

Further versions may provide for such values being determined on the basis of a tape recognition by means of the playback apparatus used.

In step 102 the values W1 and W2 from the rotational speed sensors 11 and 15 respectively are read in.

In step 103 a first term T1 is computed from the read-in variables $$(2*al)/e*(R1-R0) \qquad (1)$$

In step 104 a second term is computed from:

$$W1^2 - W0^2 \qquad (2)$$

The term (1) is a conversion of the term $$4*\pi*al*N1. \qquad (3)$$

The term (3) results from the following basic equations:

$$dN1/dt = W1/(2*\pi), \qquad (a)$$

which indicates the relationship between the time or temporal variation of the number of windings N1 on the first spool 12 and its rotational speed W1.

The following further basic equation also is incorporated into the term (3):

$$dw1/dt = -al, \qquad (b)$$

which indicates the relationship between the time or temporal variation of the rotational speed W1 and the target value of the deceleration al.

Introducing the abbreviation $$p=R1/R2 \qquad (c)$$

and considering $$R1=p*q/(1+p^2)^{1/2} \qquad (d)$$

the term (1) leads to $$2*al/e*(p*q/(1+p^2)^{1/2}-R0). \qquad (4)$$

Thus, the first term T1, in the form of (1) or, respectively, (4) under consideration of the already named definitions for the individual variables, represents a value for the rewinding time which is required to reduce the rotational speed of the first spool 12 at the deceleration rate al to the predetermined end rotational speed W0.

In step 105 it is checked whether the first term T1 is greater than the second term T2. In case of "yes" the procedure continues at step 106 where the rotational speed W1 of the first spool 12 is further increased. Subsequent to this the procedure leads to step 102 so that steps 102 through 105 are run through anew.

If in step 105 it is determined that the first term T1 is not larger than the second term T2 then a step 107 follows in which the rotational speed W1 of the first spool 12 is reduced according to the target value for the deceleration a1.

Figure 3A:
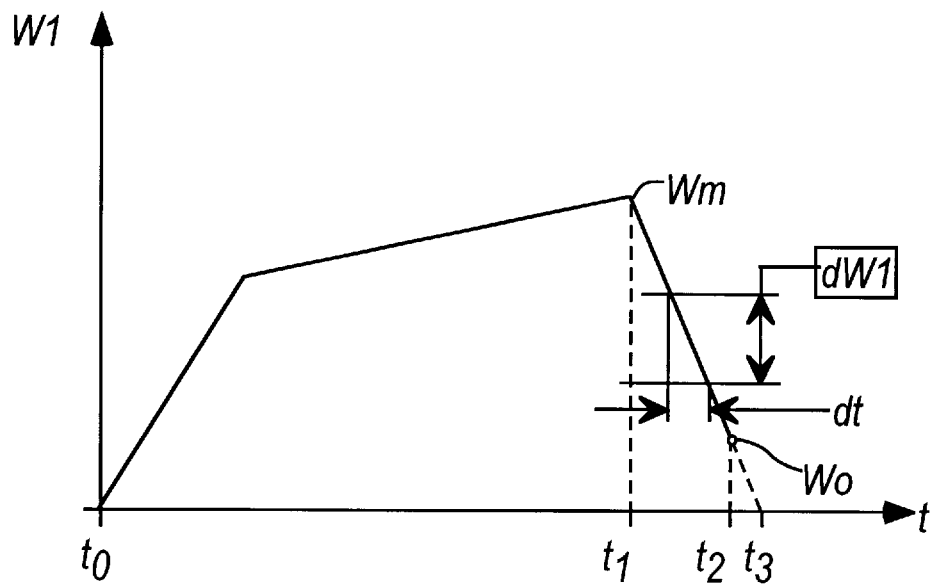
FIG. 3A: illustrates the temporal behavior of the rewinding speed according to the invention.
Figure 3B:
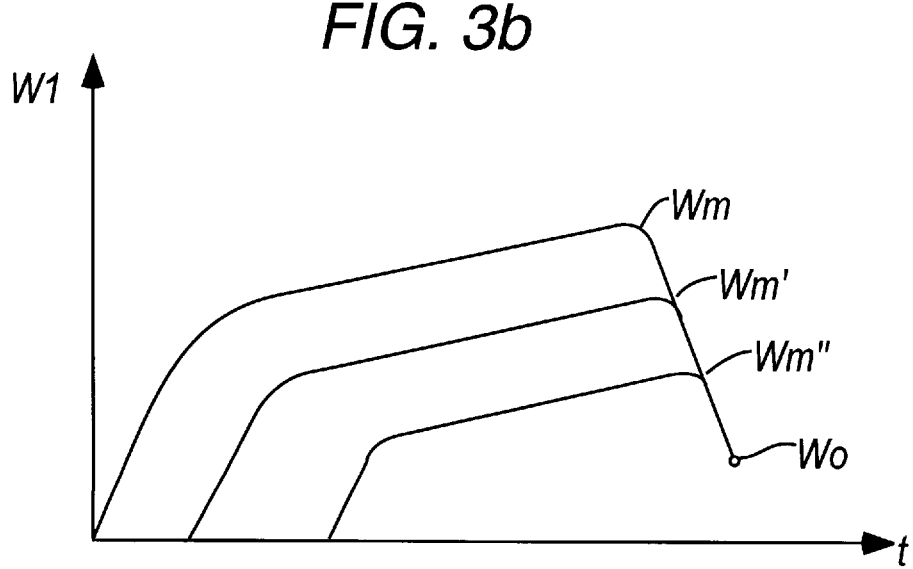
FIG. 3B: Illustrates various rotational speeds resulting from different starting points.

The effect of the process according to the invention can be seen from FIG. 3, consisting of FIG. 3a and FIG. 3b. Having reached rotational speed W0, the mechanical brakes may be employed to halt the tape and spool 12, at time t3 without tape damage, deformation or detachment from the spool hub.

FIG. 3b shows differing progressions of the rotational speed W1. These can be caused, for example, by differing starting points for the rewinding procedure.

It can be seen that the target deceleration rate al and the end rotational speed W0 always have the same magnitude. However, the values for the maximum rotational speed Wm are differing.

In a second embodiment example the first and the second term are converted in such a way that a calculation and the subsequent comparison can be performed by the electronic controller 10 as quickly as possible.

Because, towards the end of the rewinding process, $$p=R1/R2 \qquad (c)$$

becomes very much smaller than 1, it follows as an approximation from (d) that $$R1=q*p, \qquad (e)$$

whereby the following results from (4) and (2) as new first term T1'

$$dT^2(2*al/e*(q*p-R0)+1/dT0^2). \qquad (5)$$

Hereby, T=1/W1 and T0=1/W0.

The new first term T1' according to (5) is now checked as to whether it is smaller or greater than the new second term T2' which constantly has the value "1".

The corresponding procedure is similar to the flow chart of FIG. 2, however, "T1" is to be replaced by "T1'" and T2" is to be replaced by "T2'".

A further improvement of computation speed results from a further embodiment example.

The second drive means 18a which is contained in the second rotating means 18 is rigidly coupled with a rotor—not shown—which comprises digital marks exhibiting optical, magnetic or other properties which are detected by a suitable sensor.

The number of marks detected within one revolution of the first spool 12 lead to a signal FG1, and the number of marks detected within one revolution W2 of the second spool 14 lead to a signal FG2.

As the second spool 14 is usually driven at the maximum rotational speed of the second drive means the rotational speed of the spool 14 and, therewith, also FG2 is constant.

The rotational speed of the first spool 12, however, increases with decreasing first radius R1. Hereby is valid $$R1/R2=FG1/FG2=p. \qquad (c')$$

The speed of calculating the new first term according to (5) can be improved if constants are combined, such as, for example, $$dT^2*(K1*FG1*K2). \qquad (5a)$$

with

K1=2*al*q/(e*FG2);

K2=1/dT0²−2*al*q*R0/(e*FG2). In addition, further usual approximations can be performed in the term (5) or, respectively (5a).

One version for both above-named embodiment examples takes into account the case when a recording tape 13 is used having characteristic variables such as thickness e, core radius R0, surface value q, etc. which deviate from the values stored as average value in the memory 19.

In this case it is possible that the new first term (5), (5a) becomes negative. As the computations are usually performed in digital form, under certain circumstances the result may be that a complementary value is formed which is interpreted as a high positive value so that the query in step 105 gives the result "yes" and a new acceleration is performed during the deceleration phase.

This is avoided in that upon initiation of the deceleration phase, i.e. after the maximum speed Wm has been exceeded, a flag is set which prevents a subsequent acceleration.

It is also conceivable that a query is made as to whether the value of the term under consideration is consistantly changing.

If the term under consideration becomes negative then the rewinding procedure is performed at constant speed W0.

Further versions of the introduced embodiment examples may include at least one of the following variations:

instead of individual values a multiplicity of values, from which always a corresponding mean is formed, serve for determining whether an acceleration or a deceleration is performed;

at the query in step 105 a hysteresis can be provided thereby avoiding strong regulating oscillations;

the radii R1, R2 can be determined by sensors which are not shown here. Thus, thicknesses D1, D2 can be determined by measuring optical variables such as, for example, the distance of the outer winding from a reference point, or R1 and R2 can be determined by measuring magnetic variables or other methods known to the expert in the art;

during the deceleration phase from Wm to Wo the D component of a PID controller used for the triggering or controlling the electric motor is modified in such a way that overshooting is substantially reduced.

Thus, a system consisting of a process and a device suitable for implementing this process is disclosed which allows quick rewinding of a recording tape between spools.

In accordance with the invention an end rotational speed is determined from which the tape can be braked by means of a braking means for example 17b and 18b without unduly strong mechanical stress.

Furthermore, a maximum target deceleration is determined which is usually attained by reduced triggering of a drive means for example electric motor 17a and 18a employed without the use of the said braking means for example 17b and 18b. This target deceleration is chosen to avoid loop formation and to maintain contact between the tape and sensors for detecting special marks such as, for example, the start of a film or program recorded on a video tape.

The feeding first spool is accelerated according to the invention while the remaining rewinding time is sufficient to permit decelerating to the end rotational speed at the target deceleration rate.

The remaining rewinding time is compared with the required time by means of comparison of terms taking into account, besides the end rotational speed and the target deceleration, operating variables (working parameters) such as the radii of the first and the second spool, the associated rotational speeds and similar.

Moreover, variables are also taken in account which depend on the type of the recording tape used. These variables can either be stored in a memory as average values and considered for the calculation. Alternatively, the type of recording tape used is detected by a tape identification facility. Thereupon, characteristic values, which have been previously stored in a table or, which have been calculated, can be used.

The system according to the invention significantly reduces the required rewinding time compared to known systems (for example, about 100 seconds for a 180 minutes video tape). Furthermore, excessive mechanical stressing of the recording tape is avoided and a steady contact with a read head is attained.

In addition, it should be mentioned that, when large cores 12a, 14a are used, p is set to "1" in the denominator in the approximation for equation (d).

I claim:

1. A method of rapidly transferring a recording tape from a first spool onto a second spool, said spools being driven by at least one motor, comprising the steps of:

increasing a rotational speed of said first spool in a tape unwinding direction, said tape being wound onto said second spool;

measuring said rotational speed of said first spool;

calculating a value representing a remaining unwinding time of said first spool based upon at least one stored parameter, a calculated value representing a number of windings remaining on said first spool, and said measured rotational speed; and, initiating deceleration of said first spool at a predetermined rate, when said remaining unwinding time is just sufficient to complete a predetermined change of rotational speed to a predetermined non-zero rotational speed, said predetermined rate is selected to maximize deceleration while avoiding loop formation without use of mechanical braking means, said predetermined non-zero rotational speed is selected to permit mechanical braking from said non-zero rotational speed within a minimized time period without tape damage.

2. The method of claim 1 wherein said number of windings on said first spool is determined using a thickness of said tape, a radius of a core of said first spool, and a total thickness of said tape on said first spool.

3. The method of claim 2 wherein said thickness of said tape, and said radius of said core are read from a memory.

4. The method of claim 2 wherein a value representing rewinding time is determined using a number representing tape windings on said first spool.

5. An apparatus for rapidly rewinding a recording tape from a first spool onto a second spool said apparatus comprising:

first means for rotating said first spool;

second means for rotating said second spool, said second spool receiving said recording tape from said first spool;

first and second sensors for sensing rotational speeds of said first and second spools respectively;

means for reading a plurality of stored parameters;

means for receiving said rotational speeds, and said plurality of stored parameters, and calculating remaining rewinding time therefrom and decelerating said rotational speed of said first spool at a predetermined rate when said remaining rewinding time is just sufficient to accomplish a predetermined deceleration to a predetermined non-zero rotational speed; and said predetermined rate is selected to maximize deceleration while avoiding loop formation without use of mechanical braking means, said predetermined non-zero rotational speed is selected to permit mechanical braking from said non-zero rotational speed within a minimized time period without tape damage.

6. The apparatus of claim 5, wherein during a first period equal to one rotation of said second spool a first number of rotations of said first spool is calculated by said receiving means, and during a second period equal to one rotation of said second spool a second number of rotations of said first spool is calculated by said receiving means, said calculated first and second numbers of rotations are utilized for calculation of said remaining rewind time.

7. The apparatus of claim 5, wherein during a first period equal to one rotation of said first spool a first number of rotations of said second spool is calculated by said receiving means, and during a second period equal to one rotation of said first spool a second number of rotations of said second spool is calculated by said receiving means, said calculated first and second numbers of rotations are utilized for calculation of said remaining rewind time.

* * * * *

UNITED STATES PATENT AND TRADEMARK OFFICE
CERTIFICATE OF CORRECTION

PATENT NO : 5,803,387
DATED : September 8, 1998
INVENTOR(S): Philippe Mace

It is certified that error appears in the above-identified patent and that said Letters Patent are hereby corrected as shown below:

On the title page, item [75]

The name of the sole inventor is "Philippe Macé".

Signed and Sealed this

Twelfth Day of January, 1999

Attest:

Attesting Officer  *Acting Commissioner of Patents and Trademarks*